US010250925B2

(12) United States Patent
Agrawal (10) Patent No.: US 10,250,925 B2
(45) Date of Patent: Apr. 2, 2019

(54) DETERMINING A PLAYBACK RATE OF MEDIA FOR A REQUESTER

(71) Applicant: Motorola Mobility LLC, Chicago, IL (US)

(72) Inventor: Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 24 days.

(21) Appl. No.: 15/041,740

(22) Filed: Feb. 11, 2016

(65) Prior Publication Data
US 2017/0238026 A1 Aug. 17, 2017

(51) Int. Cl.
*H04N 21/2387* (2011.01)
*H04N 21/61* (2011.01)
(Continued)

(52) U.S. Cl.
CPC ....... *H04N 21/2387* (2013.01); *G06F 3/0488* (2013.01); *G06F 3/04847* (2013.01); *G06F 3/165* (2013.01); *G10L 15/005* (2013.01); *G10L 21/043* (2013.01); *G10L 21/057* (2013.01); *H04N 21/25883* (2013.01); *H04N 21/42203* (2013.01); *H04N 21/4394* (2013.01);
(Continued)

(58) Field of Classification Search
CPC ............. G11B 27/005; H04N 21/4394; H04N 21/440281; H04N 21/4532; H04N 5/783; H04N 21/44008; H04N 21/47217; H04N 21/2387; H04N 21/84; G10L 15/005; G10L 21/043; G10L 21/057; G09B 19/06; G06F 3/165
See application file for complete search history.

(56) References Cited

U.S. PATENT DOCUMENTS

| | | | | |
|---|---|---|---|---|
| 7,274,775 B1 * | 9/2007 | Zavaliagkos | ......... | H04M 3/533 369/25.01 |
| 8,848,608 B1 * | 9/2014 | Addepalli | ............. | H04W 4/046 370/328 |

(Continued)

OTHER PUBLICATIONS

Google Play, "Audio Speed Changer", https://play.google.com/store/apps/details?id=gabriel.audioslower.lite&hl=en, Feb. 11, 2016, 2 pages.
(Continued)

*Primary Examiner* — Benjamin R Bruckart
*Assistant Examiner* — Jen-Shi Huang
(74) *Attorney, Agent, or Firm* — Yudell Isidore PLLC (57) ABSTRACT

A method, a system, and a computer program product for providing media to a requester at a particular playback rate associated with the requester. The method includes receiving a request from a requester for a playback session of media that includes a time varying content. In response to receiving the request, a profile associated with the requester is accessed to determine a playback rate of the media for the requester. In response to determining the playback rate of the media for the requester, the media is provided to the requester at the determined playback rate. The method further includes monitoring the playback session of the media for playback changes by the requester and dynamically adapting the playback rate associated with the requester based on the type and frequency of playback changes.

18 Claims, 6 Drawing Sheets

(51) Int. Cl.

| | |
|---|---|
| *H04N 21/44* | (2011.01) |
| *H04N 21/472* | (2011.01) |
| *H04N 21/442* | (2011.01) |
| *H04N 21/422* | (2011.01) |
| *H04N 21/439* | (2011.01) |
| *H04N 21/84* | (2011.01) |
| *H04N 21/45* | (2011.01) |
| *H04N 21/258* | (2011.01) |
| *G10L 15/00* | (2013.01) |
| *G10L 21/043* | (2013.01) |
| *G10L 21/057* | (2013.01) |
| *G06F 3/16* | (2006.01) |
| *G06F 3/0484* | (2013.01) |
| *G06F 3/0488* | (2013.01) |

(52) U.S. Cl.
CPC ..... *H04N 21/442* (2013.01); *H04N 21/44008* (2013.01); *H04N 21/4532* (2013.01); *H04N 21/47217* (2013.01); *H04N 21/6125* (2013.01); *H04N 21/84* (2013.01)

(56) References Cited

U.S. PATENT DOCUMENTS

| | | | | |
|---|---|---|---|---|
| 2003/0194210 A1* | 10/2003 | Shiiyama | ............ | G11B 27/005 386/344 |
| 2004/0152054 A1* | 8/2004 | Gleissner | ................ | G09B 5/06 434/156 |
| 2005/0010952 A1* | 1/2005 | Gleissner | ................ | G09B 5/06 725/46 |
| 2005/0185779 A1* | 8/2005 | Toms | ...................... | G10L 17/22 379/114.14 |
| 2008/0235087 A1* | 9/2008 | Amento | ................ | G06Q 30/02 705/14.54 |
| 2010/0125834 A1* | 5/2010 | Matic | .................. | G06F 11/3624 717/125 |
| 2011/0082685 A1* | 4/2011 | Ahlin | .................. | G02B 27/017 704/8 |
| 2011/0103560 A1* | 5/2011 | Ratzlaff | .............. | H04M 1/6505 379/88.07 |
| 2011/0255842 A1* | 10/2011 | Hindle | ................. | G11B 27/105 386/262 |
| 2011/0295395 A1* | 12/2011 | Abe | ...................... | G11B 19/022 700/94 |
| 2013/0031266 A1* | 1/2013 | Gilson | ................. | G11B 27/005 709/232 |
| 2013/0041661 A1* | 2/2013 | Lee | .......................... | G10L 15/26 704/235 |
| 2013/0080895 A1* | 3/2013 | Rossman | ............ | G06F 3/04883 715/720 |
| 2014/0046661 A1* | 2/2014 | Bruner | ............... | H04N 21/4884 704/235 |
| 2014/0267899 A1* | 9/2014 | Radloff | .............. | H04N 21/2393 348/390.1 |
| 2017/0064244 A1* | 3/2017 | Abou Mahmoud | . | G11B 27/005 |

OTHER PUBLICATIONS

Google Play, "Audipo: Audio Speed Changer", https://play.google.com/store/apps/details?id=jp.ne.sakura.ccice.audipo&hl=en, Feb. 11, 2016, 3 pages.

Microsoft, "Change Playback Speed in Windows Media Player", http://windows.microsoft.com/enus/windows/changemediaplayerplaybackspeed#1TC=windows7, Feb. 11, 2016, 2 pages.

VLC Help, "Controlling Playback Speed in VLC Media Player", https://www.vlchelp.com/controllingplaybackspeedvlcmediaplayer/, Feb. 11, 2016, 11 pages.

* cited by examiner

DETERMINING A PLAYBACK RATE OF MEDIA FOR A REQUESTER

BACKGROUND

1. Technical Field

The present disclosure generally relates to electronic devices and in particular to an improved method for determining a playback rate of media on an electronic device.

2. Description of the Related Art

Pre-recorded audio and/or video media content, such as informational or academic lectures, are frequently listened to by listeners having a wide range of topic comprehension and ability to understand the spoken speech of the speaker. Oftentimes, a listener may not fully comprehend the media when played at normal recorded pace. This may be due to a host of factors, such as, rate of speech by the speaker, or a difference in the speaker's accent or dialect from that of the listener, among others. For example, the speaker in the recorded media may be difficult to comprehend for persons from other geographic regions (or countries) and/or persons who are not accustomed to the specific dialect or rate of speech of the speaker. As another example, the rate of speech of the speaker in the recorded media may also be too slow for other persons that speak a same dialect as the speaker and/or that are accustomed to a faster rate of speech. Current solutions only provide controls during playback sessions of media for a viewer/listener of media to manually rewind, replay, or change a viewing/listening speed of the media for that playback session.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a system, and a computer program product for providing media to a requester at a particular playback rate associated with the requester. The method includes receiving a request from a requester for a playback session of media that includes a time varying content. In response to receiving the request, a profile associated with the requester is accessed to determine a playback rate of the media for the requester. In response to determining the playback rate of the media for the requester, the media is provided to the requester at the determined playback rate. The method further includes monitoring the playback session of the media for playback changes by the requester and dynamically adapting the playback rate associated with the requester based on the type and frequency of playback changes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following description.

In the following detailed description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

As utilized herein, media refers to any time-varying content that includes at least one of audio content, video content, or text. In one embodiment, media may include multimedia content such as a video presentation that includes speech by a speaker. In one embodiment, speech refers to audible spoken language. In another embodiment, speech may include unspoken language such as sign language and/or text, including but not limited to, subtitles.

As utilized herein, a speaker refers to an individual that expresses spoken and/or unspoken language in media. In one embodiment, media may include only a single speaker. In another embodiment, media may contain multiple speakers.

As utilized herein, a requester refers to a person/party that is requesting playback of a particular media and that will consume the media. In one embodiment, the requester may request the media at a same device where the media is stored. In another embodiment, the requester may issue a request to remotely-access and playback (or stream) media that is stored on another device and/or in another physical location.

Figure 1:
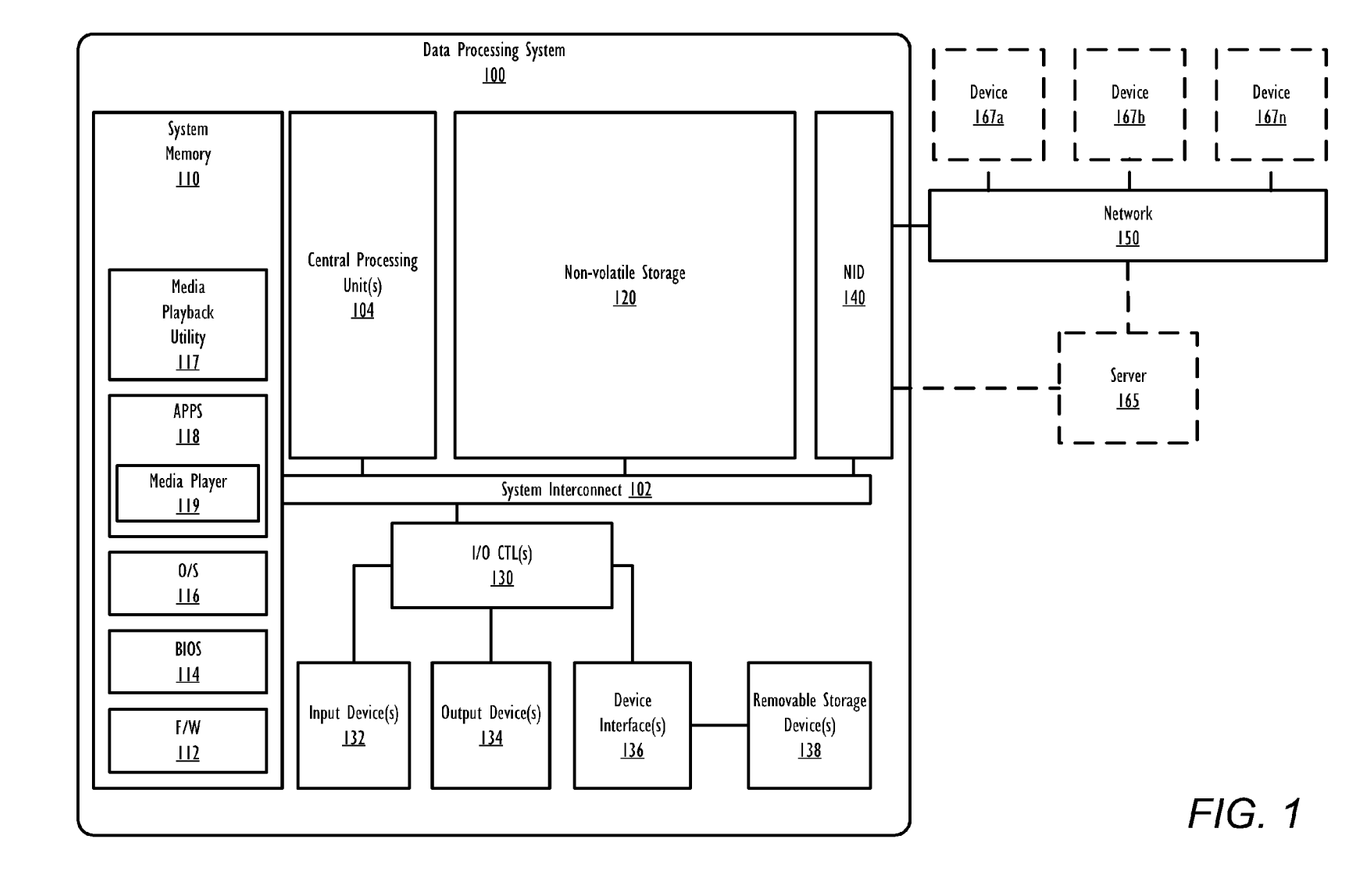
FIG. 1 provides a block diagram representation of an example data processing system within which certain aspects of the disclosure can be practiced, in accordance with one or more embodiments.

Those of ordinary skill in the art will appreciate that the hardware components and basic configuration depicted in the following figures may vary. For example, the illustrative components within data processing system 100 are not intended to be exhaustive, but rather are representative to highlight components that are utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

With reference now to the figures, and beginning with FIG. 1, there is depicted a block diagram representation of an example data processing system (DPS) 100, within which one or more of the described features of the various embodiments of the disclosure can be implemented. In one embodiment, DPS 100 can be any electronic device such as a desktop computer, notebook computer, fitness monitoring device, mobile phone, watch, smart watch, camera, video recorder, or tablet. In another embodiment, DPS 100 may be a generic data processing system.

DPS 100 includes at least one central processing unit (CPU) or processor 104 coupled to system memory 110 and non-volatile storage 120 via system interconnect 102. System interconnect 102 can be interchangeably referred to as a system bus, in one or more embodiments. One or more software and/or firmware modules can be loaded into system memory 110 during operation of DPS 100. Specifically, in one embodiment, system memory 110 can include therein a plurality of such modules, including one or more of firmware (F/W) 112, basic input/output system (BIOS) 114, operating system (OS) 116, media playback utility (MPU) 117, and application(s) 118. In one embodiment, applications 118 may include media player 119 for outputting a requested media. These software and/or firmware modules have varying functionality when their corresponding program code is executed by CPU 104 or by secondary processing devices within DPS 100.

MPU 117 is a utility that executes within DPS 100 to provide logic that performs the various methods and functions described herein. For simplicity, MPU 117 is illustrated and described as a stand-alone or separate software/firmware/logic component, which provides the specific functions and methods described below. However, in at least one embodiment, MPU 117 may be a component of, may be combined with, or may be incorporated within firmware of DPS 100, or within the OS 116, and/or one or more of applications 118, such as a media player 119.

DPS 100 further includes one or more input/output (I/O) controllers 130, which support connection by and processing of signals from one or more connected input device(s) 132, such as a keyboard, mouse, hardware button(s), touch screen, infrared (IR) sensor, fingerprint scanner, or microphone. I/O controllers 130 also support connection with and forwarding of output signals to one or more connected output devices 134, such as monitors and audio speaker(s). Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be associated with DPS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interfaces 136 can further include General Purpose I/O interfaces, such as $I^2C$, SMBus, and peripheral component interconnect (PCI) buses.

DPS 100 comprises a network interface device (NID) 140 that enables DPS 100 and/or components within DPS 100 to communicate and/or interface with other devices, services, and components that are located external to DPS 100. In one embodiment, DPS 100 may directly connect to one or more of these external devices, such as server 165 and devices 167a-n, via NID 140. These devices, services, and components can also interface with DPS 100 via an external network, such as example network 150, using one or more communication protocols. In one embodiment, media player 119, and/or portions thereof, may be stored on server 165 and/or devices 167a-n for playing back media that is locally or remotely stored. Network 150 can be a local area network, wide area network, personal area network, and the like, and the connection to and/or between network and DPS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

Figure 2:
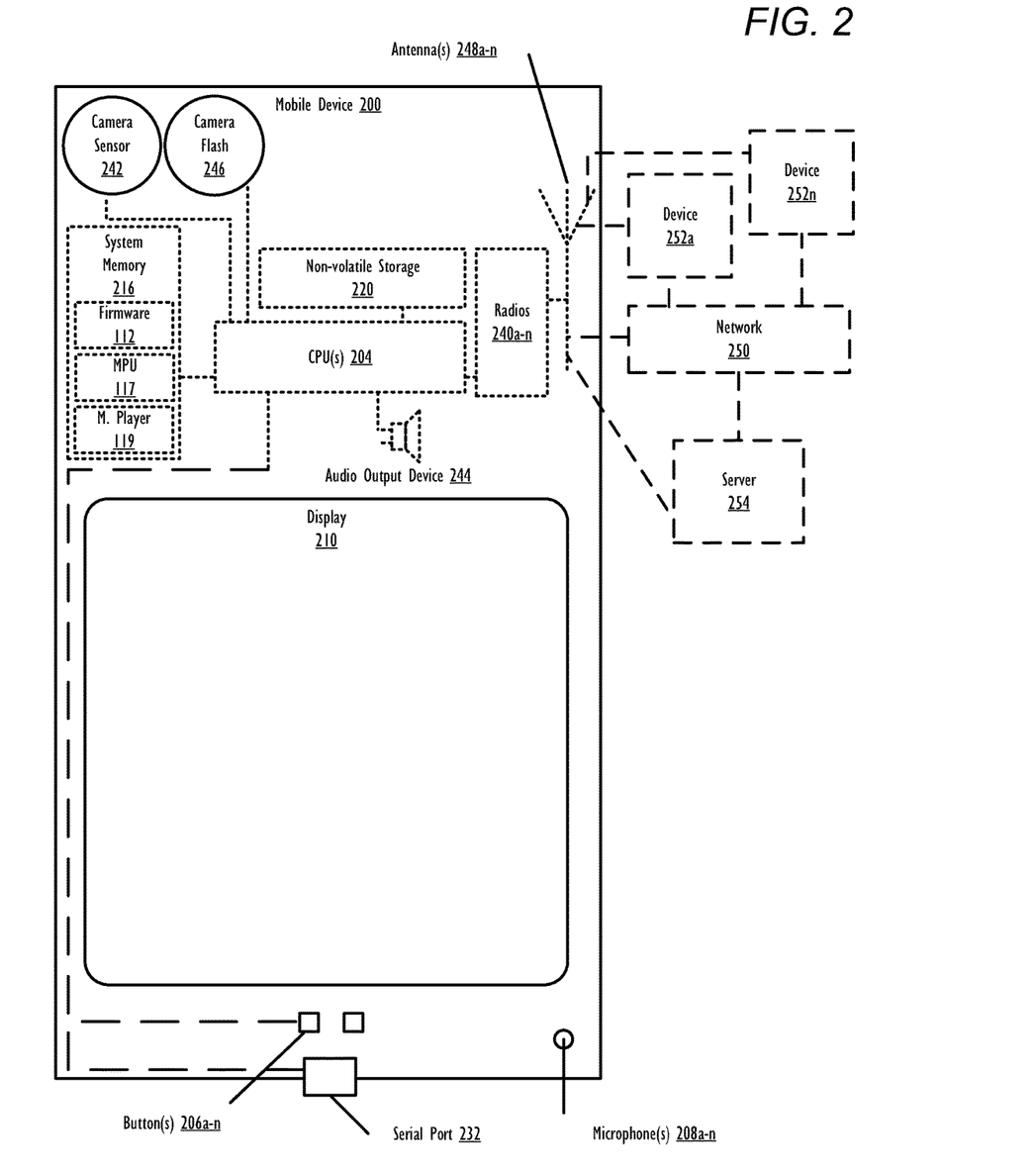
FIG. 2 illustrates a mobile device within which certain aspects of the disclosure can be practiced, in accordance with one or more embodiments.

FIG. 2 illustrates an example mobile device 200 within which one or more of the described features of the various embodiments of the disclosure can be implemented. Mobile device 200 includes at least one central processing unit (CPU) or processor 204. CPU 204 is coupled to system memory 216 and/or non-volatile storage 220, within which firmware 112, MPU 117, and media player 119 can be stored for execution on CPU 204. According to one aspect, MPU 117 executes within mobile device 200 to provide logic that performs the various methods and functions described herein. For simplicity, MPU 117 is illustrated and described as a stand-alone or separate software/firmware/logic component, which provides the specific functions and methods described below.

As shown, mobile device 200 comprises several input devices and output devices for enabling a user to interface with mobile device 200. In the illustrated embodiment, mobile device 200 includes a camera sensor 242, camera flash 246, hardware buttons 206a-"n", microphone 208, and audio output device 244 (e.g., a speaker). Microphone 208 may be used to receive spoken input/commands from a user. Audio output device 244 is used to output audio. Hardware buttons 206a-n are selectable buttons which are used to receive manual/tactile input from a user to control specific operations of mobile device 200 and/or of applications executing thereon. In one embodiment, hardware buttons 206a-n may also include or be connected to one or more sensors (e.g. a fingerprint scanner) and/or be pressure sensitive. Hardware buttons 206a-n may also be directly associated with one or more functions of the GUI and/or functions of an OS, application, or hardware of mobile device 200. In one embodiment, hardware buttons 206a-n may include a keyboard.

Mobile device 200 also includes serial port 232 (e.g., a USB (universal serial bus) port) which can be one of an input port, an output port, and an input/output port. Serial port 232 allows a direct physical connection to and communication of data with a second device. In one embodiment, serial port 232 may also connect to a power charger (not pictured) for charging a battery (not pictured) of mobile device 200.

Mobile device 200 also includes a display 210, which is capable of displaying a video of media content and/or a graphical user interface (GUI) of firmware and/or one or more applications executing on mobile device 200. In one embodiment, display 210 is a touch screen that is also capable of receiving touch input from a user of mobile device 200 interfacing with a displayed GUI. A GUI displayed by mobile device 200 on display 210 may be rendered by CPU 204.

Mobile device 200 also includes one or more wireless radios 240a-n and one or more antenna(s) 248a-n that enable mobile device 200 to wirelessly connect to, and transmit and receive data with, one or more other devices, such as devices 252a-n and server 254. As a wireless device, mobile device 200 can transmit the data over a wireless network 250 (e.g., a Wi-Fi network, cellular network, Bluetooth network, or personal area network).

Figure 3:
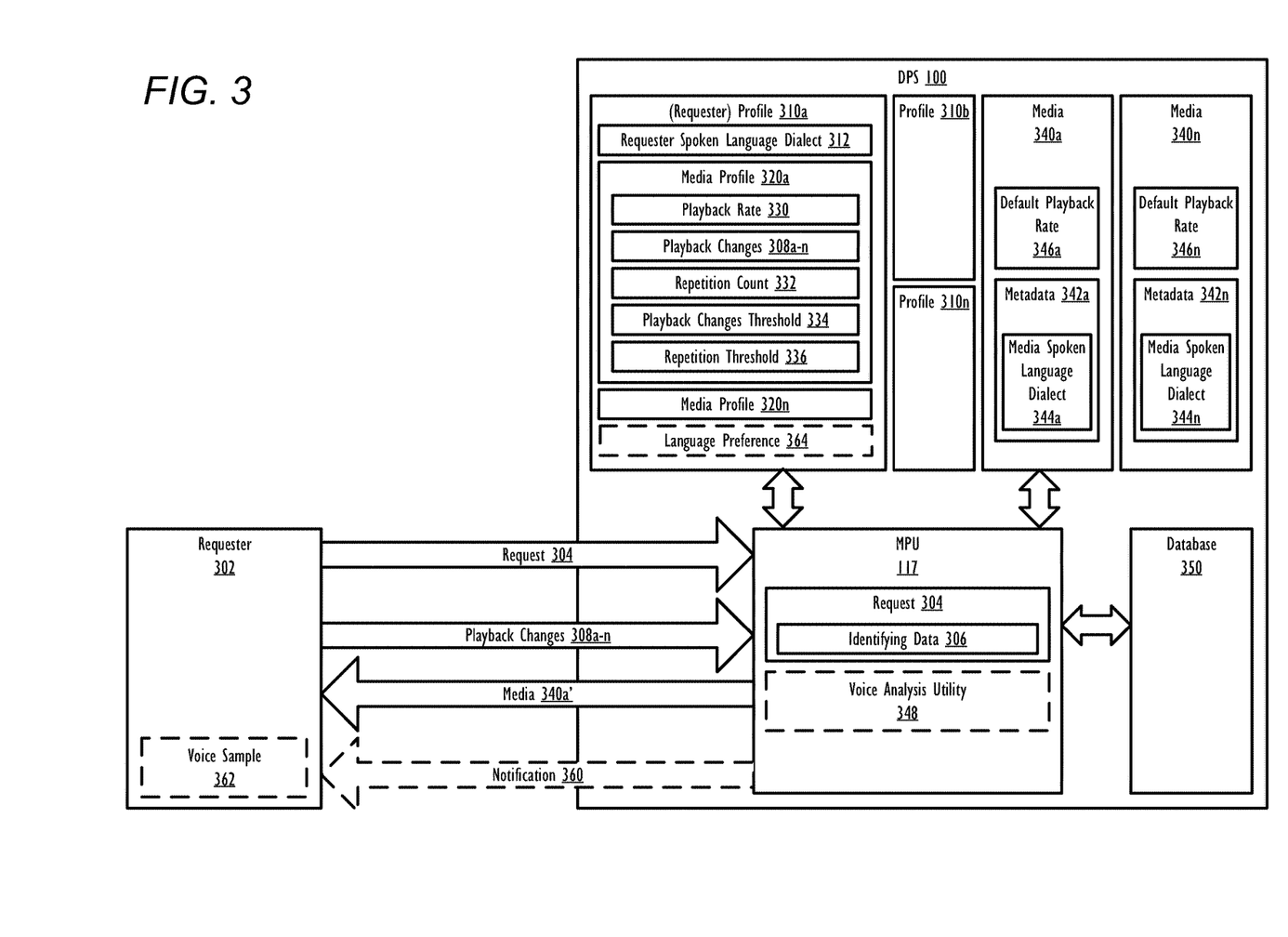
FIG. 3 illustrates an example data processing system configured for providing media playback to a requester at a playback rate that is associated with the requester, in accordance with one or more embodiments.

FIG. 3 illustrates functional components of a system, such as DPS 100, and interactions between requester 302 and DPS 100. DPS 100 includes therein profiles 310a-n, media 340a-n, and database 350. In one embodiment, each of profiles 310a-n is associated with a specific requester. In the examples and description that follows, profile 310a is associated with requester 302 and thus is hereinafter referred to as requester profile 310a. It is appreciated that in alternate embodiments, a single requester may have multiple different profiles associated with different types of media or based on some other criteria (e.g., different listening criteria for playback sessions occurring on a television, a computer, or a mobile phone). DPS 100 also includes MPU 117, which, in response to receiving a playback session request 304 for playback of media 340a-n from requester 302, determines playback rate 330 associated with requester 302 and applies the determined playback rate 330 to the requested media 340, in accordance with one or more embodiments. While FIG. 3 is described with reference to DPS 100, the functionality described herein may be performed by any device that is executing software code of MPU 117, including mobile device 200.

In one embodiment, requester 302 may be a person/party or application using DPS 100 that is requesting media 340, which includes a time-varying content, for playback on DPS 100. In another embodiment, requester 302 is a separate device from DPS 100, such as device 252a-n, that remotely requests a playback session of media 340 from DPS 100. It should be noted that, while media 340 is illustrated as being stored within DPS 100, in another embodiment, media 340a-n may be partially or entirely stored on another storage location or storage device (e.g., a network storage or server 165). In these other embodiments, DPS 100 provides, serves, and/or facilitates delivery of media 340a-n to requester 302 from the other storage location or storage device.

In addition to a time-varying content, media 340a-n may also include metadata 342a-n that identifies a default playback rate 346a-n of media 340a-n. In one embodiment, default playback rate 346 specifies a base speed for playback sessions of a corresponding media 340 that is the original recording rate of the media 340. In another embodiment, default playback rate 346 specifies a base speed for playback sessions of a corresponding media 340 that is faster or slower than the original recording rate of the media 340. In one embodiment, default playback rate 346a-n may be stored within metadata 342a-n. Metadata 342a-n provides basic information for a corresponding media 340a-n, including, but not limited to, identification of: an author, company, creation date, duration of media 340a-n, and a file size of media 340a-n. In one embodiment, metadata 342a-n may also identify media spoken language dialect 344a-n for at least one speaker in media 340a-n. Media spoken language dialect 344a-n identifies, for at least one speaker in media 340a-n: (1) a spoken language or regional dialect and/or (2) a preferred spoken language or preferred regional dialect.

In response to determining that metadata 342a does not identify media spoken language dialect 344a for the at least one speaker in media 340a, DPS 100 may perform, via voice analysis utility 348, a voice analysis on a voice of the at least one speaker of media 340a. Voice analysis utility 348 may then identify media spoken language dialect 344a of the at least one speaker within media 340 by comparing the results of the voice analysis to voice samples and identification data for a plurality of languages and/or regional dialects stored within database 350. The identified media spoken language dialect 344a may then be saved to metadata 342a. In another embodiment, DPS 100 may determine media spoken language dialect 344a for media 340a by identifying a spoken language dialect within another media (e.g. 340n) that includes the same speaker(s) as media 340a. While database 350 is illustrated as being stored within DPS 100, in another embodiment, database 350 may be partially or entirely stored on another device that is accessible to DPS 100, such a network storage or server 165.

In order to initiate a playback session of media 340a-n for requester 302, DPS 100 receives request 304 from requester 302 that identifies a requested media 340a. In one embodiment, request 304 may also contain identifying data 306, which is used by MPU 117 to identify requester profile 310a, which is associated with requester 302. In another embodiment, identifying data 306 may also be associated with a specific device and/or media player (e.g. media player 119) of requester 302. While profiles 310a-n are illustrated as being stored within DPS 100, in another embodiment, profiles 310a-n may be partially or entirely stored on another device, such as on requester 302, a network storage, or server 165, and may be delivered to DPS 100 from the other device or accessed by DPS 100 on the other device.

Using identifying data 306, DPS 100 attempts to locate requester profile 310a, which is associated with requester 302, from a plurality of profiles 310a-n that are stored on, or accessible by, DPS 100. Each profile 310a-n is associated with at least one particular user, user account, requesting device, and/or media player. And each profile 310a-n contains at least one media profile 320 that is associated with at least one particular media 340, and which may be provided to DPS 100 by a corresponding requester. In one embodiment, if a profile is not available for requester 302, DPS 100 may issue a prompt to requester 302 to create requester profile 310a.

Each profile 310a-n may contain media profiles 320a-n, which correspond to media 340a-n. Each media profile 320a-n may include playback rate 330, which specifies a playback speed of a corresponding media 340a-n for requester 302. Playback rate 330 may identify a playback speed for media 340a-n that is faster than, slower than, or equivalent to default playback rate 346a-n of media 340a-n. In response to receiving request 304 and determining that playback rate 330 is not present or has not been established for media 340a, MPU 117 may save default playback rate 346a to media profile 320a as playback rate 330. In another embodiment, playback rate 330 may be associated with more than one media 340a-n. In another embodiment, playback rate 330 may be associated with only specific media 340a-n that includes speech by a specific speaker. In response to receiving identifying playback rate 330 for a requested media 340, DPS 100 may provide media 340a at playback rate 330 to requester 302 as media 340a'.

In one embodiment, a particular media profile 320a is created by MPU 117 in response to receiving a request 304 from requester 302 for a corresponding media 340a. In another embodiment, when requester profile 310a is initially created for requester 302, requester profile 310a may be initialized to include template versions of media profiles 320a-n that correspond to each media 340a-n that requester 302 has permission to access or that requester 302 could potentially request a playback session for. In another embodiment, requester profile 310a for requester 302 is created during playback of media 340a', and the initial value of playback rate 330 is the current playback rate of media 340a' at the time when requester profile 310a is created. In another embodiment, requester profile 310a may provide, within identifying data 306, data regarding at least one device that is associated with requester 302 and/or a specific media player of requester 302 that will be used in the playback session for the media.

DPS 100 may also monitor the playback session of media 340a' for playback changes 308a-n. Playback changes 308a-n issued by requester 302 during the playback session of media 340a' are immediately applied to the playback media 340a'. Playback changes 308a-n include any adjustments (or requests for adjustments) to the playback session of media 340a' by requester 302. Playback changes 308a-n can include, but are not limited to, adjustments to playback rate 330, pausing of media 340a', rewinding of media 340a', and forward or reverse seeking within media 340a'.

In one embodiment, MPU 117 may also monitor the playback session of media 340a' for playback changes 308a-n to media 340a'. The detected playback changes 308a-n may be tracked and stored within media profile 320a. The stored playback rate 330 within requester profile 310a may be dynamically adapted (or adjusted) based on playback changes 308a-n detected during the playback session of media 340a'. In one embodiment, MPU 117 tracks playback changes 308a-n for only a current playback session of media 340a'. In another embodiment, MPU 117 may track playback changes 308a-n for all playback sessions of media 340a by requester 302 or for all playback sessions within a pre-established period of time (e.g., tracking playback changes 308a-n within a one week viewing period). In another embodiment, MPU 117 may only track playback changes 308a-n that correspond to particular types of adjustments. For example, MPU 117 may only track playback changes 308a-n that include adjustments to playback rate 330.

Media profile 320a may also include playback changes threshold 334. In one embodiment, playback changes threshold 334 establishes, for requester 302, a frequency threshold associated with at least one of: a total number of playback changes 308a-n by requester 302 and one or more specific types of playback changes 308a-n by requester 302. In response to playback changes threshold 334 being reached, MPU 117 may automatically apply an adjustment to playback rate 330 for requester 302 based on the detected playback changes 308a-n. For example, in response to detecting that requester 302 has rewound media 340a' five times and/or has slowed down the playback speed of media 340a' at least a predetermined number of times, MPU 117 may reduce playback rate 330 by a predetermined amount (e.g. 10%). Similarly, in response to detecting requester 302 has fast-forwarded media 340a' five times and/or has increased the playback speed of media 340a', MPU 117 may increase playback rate 330 by a second predetermined amount (e.g. 15%). It should also be noted that playback changes threshold 334 may further establish multiple thresholds within playback changes threshold 334. For example, MPU 117 may reduce playback rate 330 by 10% when media 340a' has been rewound five times and by 25% when media 340a' has been rewound eight times.

Media profile 320a may also include repetition count 332, which identifies a number of times that media 340a has been accessed, requested, and/or played back by requester 302, and repetition count threshold 336. In response to repetition count threshold 336 being reached, MPU 117 may automatically apply an adjustment to playback rate 330 for requester 302 based on the repetition count 332. For example, in response to requester 302 accessing media 340a' five times, MPU 117 may exponentially increase (or decrease) playback rate 330 by a predetermined amount (e.g. 10%). In one embodiment, repetition count threshold 336 may establish multiple thresholds within repetition count 332. For example, playback rate 330 may be increased by 10% when media 340a has been accessed, requested, and/or played back by requester 302 five times, and by 20% when media 340a has been accessed, requested, and/or played back by requester 302 seven times, etc.

Requester profile 310a may also include requester spoken language dialect 312. Requester spoken language dialect 312 identifies at least one of: a spoken language or regional dialect and/or a preferred spoken language or preferred regional dialect for a user that is associated with requester 302. In one embodiment, requester spoken language dialect 312 may be provided by requester 302 at the creation of requester profile 310a. In another embodiment, MPU 117 may detect when requester spoken language dialect 312 is not present or not defined within requester profile 310a. In response to determining requester spoken language dialect 312 is not present within requester profile 310a, MPU 117 may automatically determine requester spoken language dialect 312 for a user that is associated with requester 302 by analyzing, via voice analysis utility 348, voice sample 362 of the user and comparing the results of the analysis to voice samples and identification data for a plurality of languages and/or regional dialects stored within database 350. The identified requester spoken language dialect 312 may then be saved to requester profile 310a. Voice sample 362 may be received via a microphone at DPS 100 or via a microphone at another device (e.g., devices 167a-n or devices 252a-n) that acquires and transmits voice sample 362 to DPS 100. In still another embodiment, voice sample 362 may be retrieved, by DPS 100, from a local storage or a remotely accessible storage (such as a cloud storage).

In still another embodiment, in response to determining requester spoken language dialect 312 is not present within requester profile 310a, MPU 117 may autonomously determine requester spoken language dialect 312 by reading language preference setting 364 associated with requester 302 within an application (e.g., Applications 118) of DPS 100 or an application of another device (e.g., devices 167a-n or devices 252a-n) that is connected to DPS 100. The identified requester spoken language dialect 312 for requester 302 may then be saved to requester profile 310a. For example, DPS 100 may establish requester spoken language dialect 312 as a same language/regional dialect that is selected during an initial setup of an operating system by a user that is associated with requester 302. Additionally, DPS 100 may prompt a user of requester 302 to enter requester spoken language dialect 312.

In one embodiment, MPU 117 may establish or modify playback rate 330 for media 340a based on a comparison of spoken language dialect 312 and media spoken language dialect 344a indicating that a user associated with requester 302 and a speaker in media 340a share a same spoken language and/or regional dialect. For example, in response determining that requester spoken language dialect 312 of requester 302 and the media spoken language dialect 344a associated with media 340a match, MPU 117 may automatically increase playback rate 330 by a predetermined amount. Similarly, in response determining that requester spoken language dialect 312 of requester 302 and media language dialect 344a do not match, MPU 117 may automatically decrease playback rate 330 by a predetermined amount.

MPU 117 may also detect when media 340a-n contains multiple speakers and may independently adjust playback rate 330 based on a currently speaking speaker and metadata 342a-n. For example, media 340a may include (1) a first speaker that shares a same regional dialect as the user associated with requester 302 and (2) a second speaker that speaks a different regional dialect from the user. MPU 117 may dynamically increase the playback rate 330 of media 340a' to 120% of the normal rate when the first speaker is speaking and/or may dynamically decrease the playback rate 330 of media 340a' to 80% of the normal rate when the second speaker is speaking.

Additionally, in one or more embodiments, during playback sessions of media 340a-n/340a', MPU 117 may simultaneously provide notification 360 that indicates a current playback rate 330 of media 340a-n/340a'. In one embodiment, notification 360 is a visual notification that is continually or periodically displayed within the media 340a-n/340a' itself or within an application program that is executing on a same device. In another embodiment, notification 360 is an audio notification, such as a verbal announcement of the playback rate 330 that is periodically provided during playback of media 340a-n.

Figure 4:
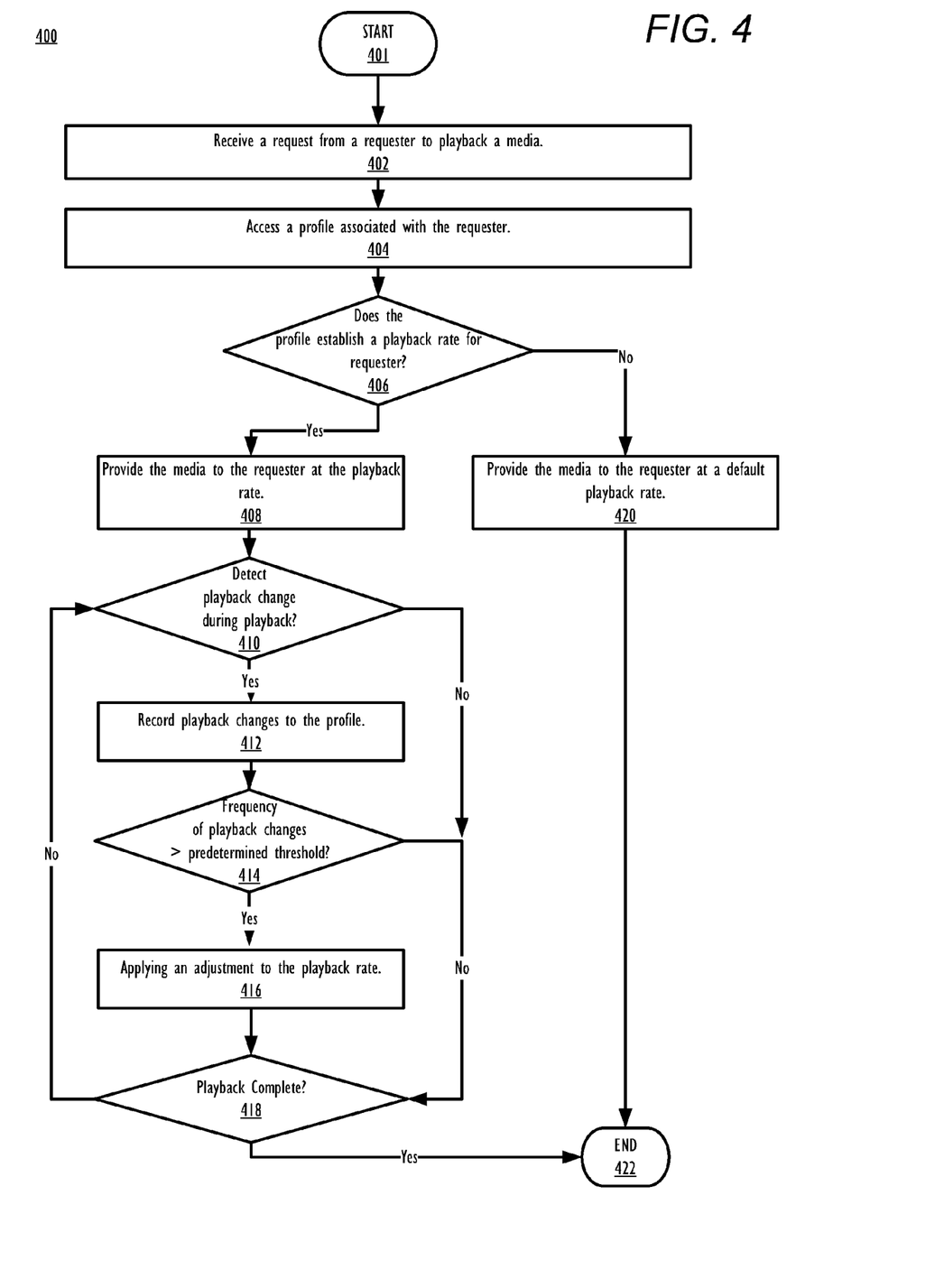
FIG. 4 is a flow chart illustrating a method for providing media playback to a requester at a playback rate that is associated with the requester, in accordance with one or more embodiments.
Figure 5:
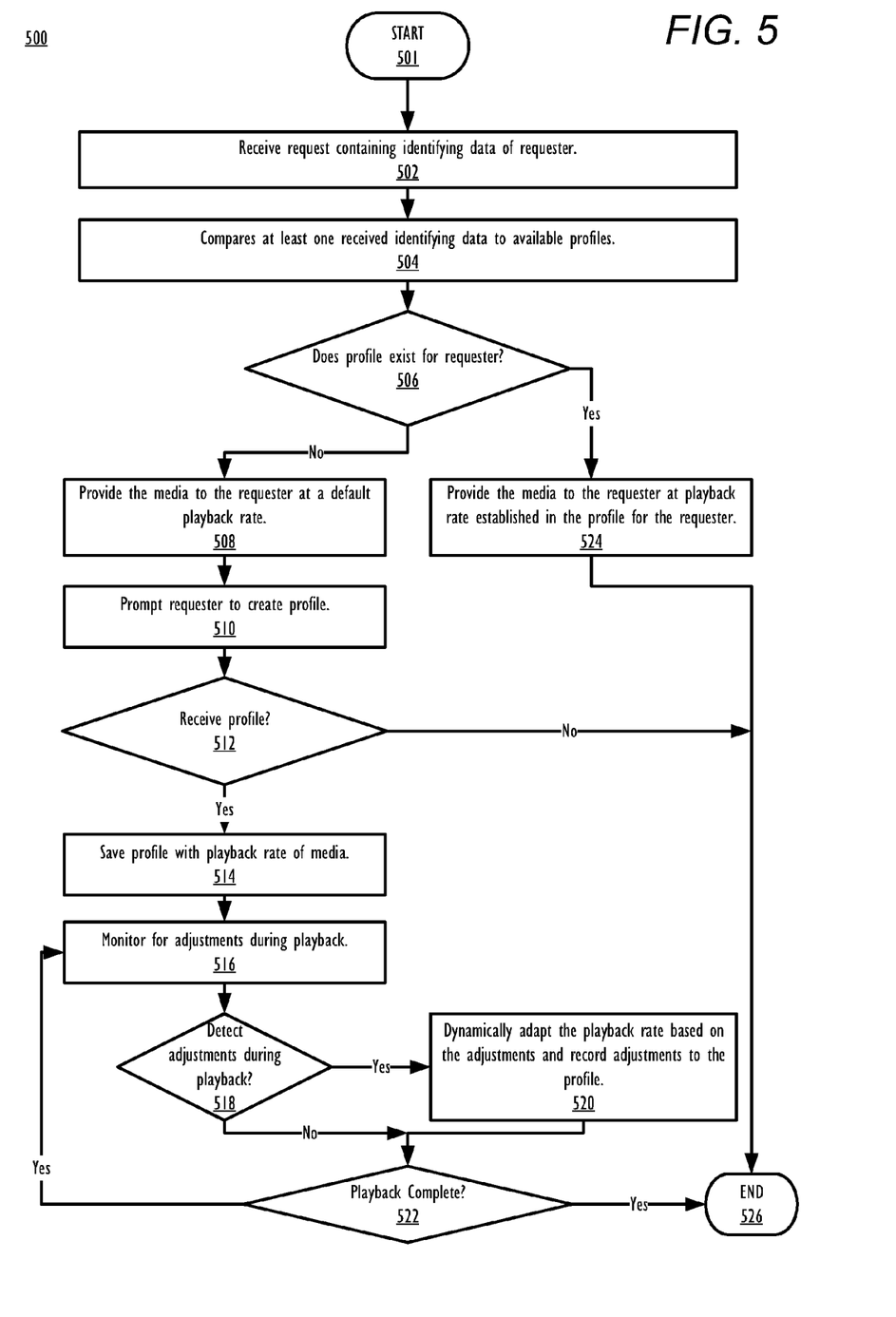
FIG. 5 is a flow chart illustrating a method for creating a profile that establishes a playback rate of at least one particular media for a requester, in accordance with one or more embodiments.
Figure 6:
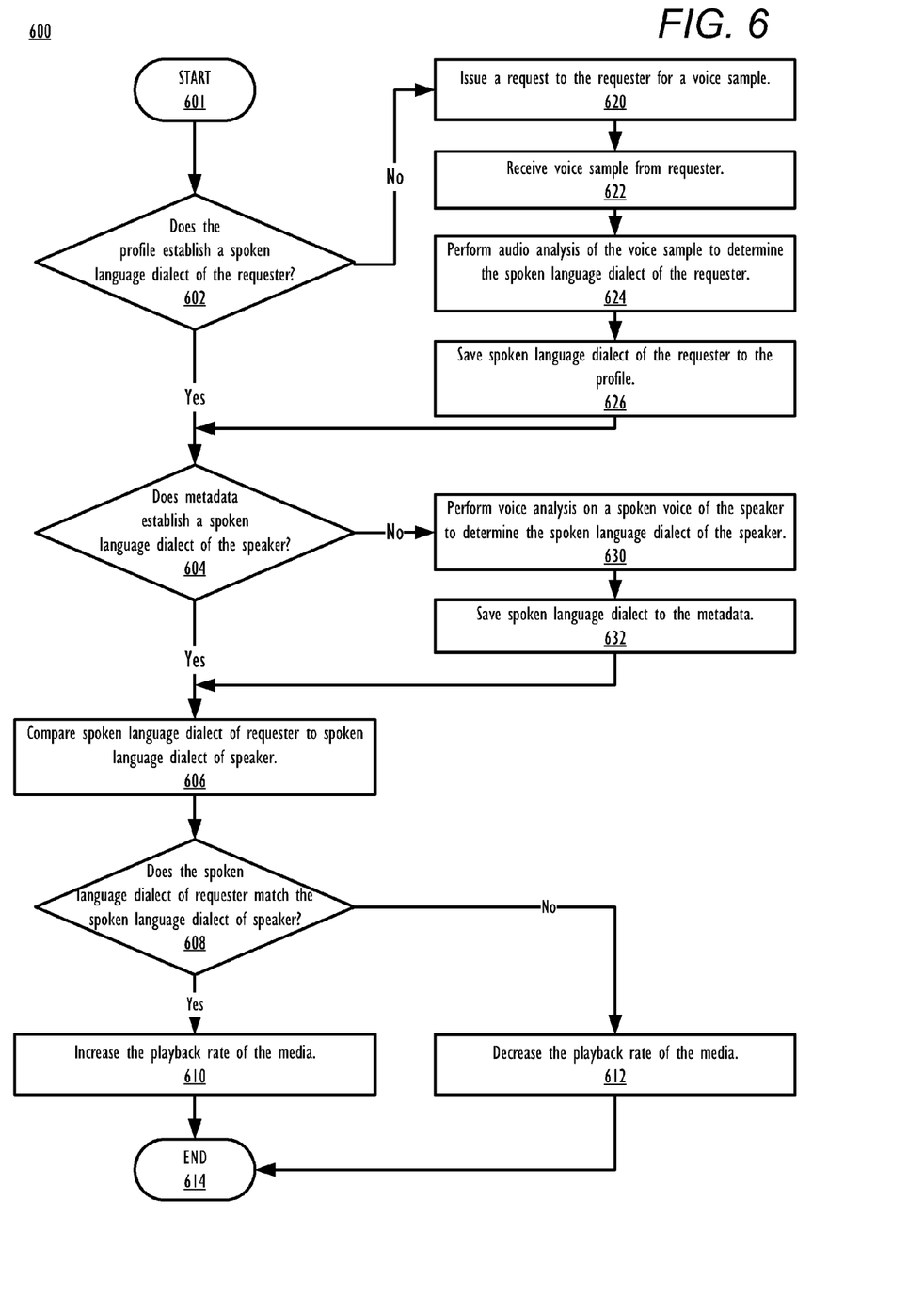
FIG. 6 is a flow chart illustrating a method for modifying a playback rate of media for a requester based on a spoken language dialect of the requester and a spoken language dialect of a speaker in the media, in accordance with one or more embodiments.

Referring now to FIGS. 4-6, there are illustrated flow charts of various methods for providing media to a requester at a particular playback rate associated with the requester, according to one or more embodiments. Aspects of the methods are described with reference to the components of FIGS. 1-3. Several of the processes of the methods provided in FIGS. 4-6 can be implemented by a processor (e.g., CPU 104 or CPU 204) executing software code of MPU 117 within a mobile device or generic data processing system. For simplicity, the methods described below are generally described as being performed by processor execution of MPU 117 within DPS 100.

Referring now to FIG. 4, there is depicted a high-level flow-chart illustrating a method for providing media to a requester at a determined playback rate associated with the requester, in accordance with one or more embodiments of the present disclosure. Method 400 commences at initiator block 401 then proceeds to block 402. At block 402, DPS 100 receives request 304 from requester 302 to play media 340a that includes a time varying content. At block 404, DPS 100 identifies requester 302 from request 304 and accesses a profile (requester profile 310a) that is associated with requester 302. At block 406, DPS 100 then determines whether requester profile 310a contains a media profile (media profile 320a) associated with media 340a and/or requester 302 that establishes playback rate 330 for media 340a. In response to determining requester profile 310a does not include playback rate 330, media 340a is provided to requester 302 at a default playback rate 346a (block 420), and the method terminates at block 422.

In response to determining requester profile 310a includes playback rate 330, the method continues to block 408 where DPS 100 applies playback rate 330 to media 340a (thus generating media 340a') and provides media 340a' to requester 302 at playback rate 330. At block 410, DPS 100 determines whether at least one playback change 308a-n has been detected during a playback session of media 340a'. In response to determining that no playback changes have been detected during the playback session of media 340a', the method continues to block 418 where DPS 100 determines whether the playback session of media 340a' has completed.

In response to DPS 100 detecting at least one playback change 308a-n by requester 302 during the playback session of media 340a', the method continues to block 412 where the detected at least one playback change 308a-n of media 340a' is recorded to media profile 320a of requester profile 310a. At block 414, DPS 100 determines whether the number of playback changes 308a-n exceeds playback changes threshold 334. In response to determining that the number of playback changes 308a-n does not exceed playback changes threshold 334, the method continues to block 418 where DPS 100 determines whether the playback session of media 340a' has completed. In response to determining that the number of playback changes 308a-n has exceeded playback changes threshold 334, DPS 100 applies an adjustment to playback rate 330 based on the detected at least one playback change 308a-n (block 416). The method then continues to block 418 where DPS 100 determines if the playback session of media 340a' has completed. In response to determining, at block 418, that the playback session of media 340a' has not yet completed, the method loops back to block 410 in an iterative manner. In response to determining, at block 418, that the playback session of media 340a' has completed, the method terminates at block 422.

Referring now to FIG. 5, there is depicted a high-level flow-chart illustrating a method for creating a profile that establishes a playback rate of at least one particular media for a requester, in accordance with one or more embodiments of the present disclosure. Method 500 commences at initiator block 501. At block 502, DPS 100 receives, from requester 302, request 304, which includes (i) a request to access a particular media 340a and (ii) at least one identifying data 306. At block 504, the at least one identifying data 306 is compared to profiles 310a-n available to DPS 100. DPS 100 then determines whether a profile (requester profile 310a) exists that is associated with requester 302 (block 506). In response to determining that requester profile 310a exists for requester 302, media 340a is provided to requester 302 at a playback rate 330 that is identified in requester profile 310a (block 524). The method then terminates at block 526.

In response to determining that a profile (requester profile 310a) does not exist for requester 302, the method proceeds to block 508 where media 340a is provided to requester 302 at a default playback rate 346a. DPS 100 then issues a prompt to requester 302 to create requester profile 310a (block 510). At block 512, DPS 100 determines whether data to create requester profile 310a has been received. In response to determining that data to create requester profile 310a has not been received (e.g., after a preset period has elapsed), the method terminates at block 526.

In response to determining that data to create requester profile 310a for requester 302 has been received, the method continues to block 514 where requester profile 310a is saved with a playback rate 330 for media 340a. In one embodiment, the saved playback rate 330 may be the default playback rate 346a, a predetermined playback rate established by MPU 117, or a most recent playback rate of media 340a that was applied by requester 302. At block 516, DPS 100 monitors the playback session of media 340a for any adjustments/playback changes 308a-n by requester 302. At block 518, DPS 100 determines whether any adjustments have been detected during the playback session. In response to determining that no adjustments to media 340 have been detected during the playback session of media 340 (block 518), the method continues to block 522. In response to determining at least one adjustment by requester 302 has been detected during the playback session of media 340 (block 518), DPS 100 dynamically adapts the playback rate of media 340 based on the adjustments and the adjustments are recorded as playback changes 308a-n within requester profile 310a (block 520) and the method continues to block 522. At block 522, DPS 100 determines whether the playback session of media 340 has completed. In response to determining the playback session of media 340 has not completed, the method loops back to block 516 in an iterative manner. In response to determining the playback session of media 340 has completed, method 500 terminates at block 526.

Referring now to FIG. 6, there is depicted a high-level flow-chart illustrating a method for modifying a playback rate of media for a requester based on a spoken language dialect of the requester and a spoken language dialect of a speaker in the media, in accordance with one or more embodiments of the present disclosure. Method 600 commences at initiator block 601. At block 602, DPS 100 determines whether requester profile 310a for requester 302 of a particular media 340a identifies requester spoken language dialect 312 for requester 302. In response to determining that requester profile 310a identifies requester spoken language dialect 312 for requester 302, the method continues to block 604. In response to determining that requester profile 310a does not identify requester spoken language dialect 312 for requester 302, the method continues to block 620. At block 620, DPS 100 issues a request to requester 302 for a voice sample. At block 622, a voice sample is received from requester 302. At block 624, DPS 100 performs an audio analysis on the voice sample to determine requester spoken language dialect 312 of requester 302. At block 626, requester spoken language dialect 312 of requester 302 is saved to requester profile 310a. The method then continues to block 604.

At block 604, DPS 100 determines whether metadata 342a exists for media 340a that identifies media spoken language dialect 344a for at least one speaker in media 340a. In response to determining that metadata 342a identifies media spoken language dialect 344a for at least one speaker in media 340a, the method continues to block 606. In response to determining that metadata 342a does not establish media spoken language dialect 344a for at least one speaker in media 340a, the method continues to block 630 and DPS 100 performs a voice analysis on a spoken voice of the speaker in media 340a to determine media spoken language dialect 344a for the at least one speaker. Media spoken language dialect 344a is then saved to metadata 342a (block 632) and the method continues to block 606.

At block 606, DPS 100 compares requester spoken language dialect 312 of requester 302 to media spoken language dialect 344a. At block 608, DPS 100 determines whether requester spoken language dialect 312 matches media spoken language dialect 344a. In response to determining that requester spoken language dialect 312 of requester 302 matches media spoken language dialect 344a of the at least one speaker, DPS 100 increases playback rate 330 of media 340a (block 610), and the method terminates at block 614. In response to determining that requester spoken language dialect 312 of requester 302 does not match media spoken language dialect 344a of the at least one speaker, DPS 100 decreases playback rate 330 of media 340a (block 612), and the method terminates at block 614.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
    receiving, by at least one input device of a data processing system, a request from a requester for a playback session of media that includes a time varying content and which is associated with a default playback rate that establishes a base speed for playback sessions of the media;
    in response to receiving the request, retrieving, from a storage that is accessible to the data processing system, a profile associated with the requester and determining, from the profile, a playback rate of the media for the requester that is different from the default playback rate of the media;
    in response to determining the playback rate of the media for the requester, providing, by at least one output device, the media to the requester at the determined playback rate during the playback session of the media;
    during the playback session, monitoring the at least one input device for at least one playback change made by the requester;
    detecting, during the playback session of the media, playback changes made by the requester via the at least one input device, the playback changes comprising at least one of an adjustment to the playback rate of the media, pausing of the media, forwarding of the media, and rewinding of the media;
    in response to detecting at least one playback change by the at least one input device, dynamically adapting the playback rate associated with the requester based on the received at least one adjustment by applying at least one of: an increase and a decrease to the playback rate;
    determining whether a number of occurrences of a particular type of playback change received via the at least one input device has exceeded a predetermined threshold number of playback changes of the particular type, wherein the predetermined threshold number is greater than one; and
    in response to determining that the number of occurrences of the particular type of playback change has exceeded the predetermined threshold, automatically applying an adjustment to the playback rate of the media for the requester based on the number of occurrences of the particular type of playback change, wherein the adjustment to the playback rate includes one of: an increase and a decrease to the playback rate; and
    applying the adjusted playback rate as the playback rate stored within the profile.

2. The method of claim 1, wherein the time varying content includes at least one of audio content and video content, the method further comprising:
    contemporaneously with the playback session of the media, providing a notification of a current playback rate of the media to the requester, wherein the notification includes at least one of an audio notification and a visual notification.

3. The method of claim 1, wherein accessing the profile associated with the requester comprises:
    first identifying the requester via at least one received identifying data;

comparing the identifying data to available profiles established for media playback; and
in response to determining that there is no established profile for the requester:
  providing the media to the requester at the default playback rate;
  prompting the requester to create the profile; and
  in response to the requester creating the profile, saving the profile and establishing, within the profile, the playback rate of the media for the requester at the default playback rate.

4. The method of claim 1, wherein determining the playback rate of the media for the requester further comprises:
detecting a repetition count corresponding to a number of times the media has been accessed by the requester; and
in response to the repetition count being greater than a predetermined threshold count, applying an adjustment to the playback rate of the media for the requester based on the repetition count, wherein the adjustment to the playback rate includes one of: an increase and a decrease to the playback rate.

5. The method of claim 1, wherein the media includes an audio recording of speech provided by a speaker, and wherein determining the playback rate of the media for the requester further comprises:
determining, from the profile, a first spoken language dialect of the requester;
determining, from metadata associated with the media, a second spoken language dialect of the speaker;
determining whether the first spoken language dialect and the second spoken language dialect match;
in response to the determining that the first spoken language dialect and the second spoken language dialect match, increasing the playback rate of the media; and
in response to the determining the first spoken language dialect and the second spoken language dialect do not match, decreasing the playback rate of the media.

6. The method of claim 5, wherein determining the first spoken language dialect of the requester further comprises:
in response to determining that the profile does not identify the first spoken language dialect of the requester:
  issuing a request to the requester for a voice sample;
  receiving the voice sample from the requester;
  performing an audio analysis of the voice sample to identify the first spoken language dialect; and
  saving the determined first spoken language dialect to the profile.

7. The method of claim 5, wherein determining the first spoken language dialect of the requester further comprises:
in response to determining that the profile does not identify the first spoken language dialect of the requester:
  identifying a preferred language of the requester within a language preference setting of the requester; and
  saving the preferred language to the profile as the first spoken language dialect.

8. The method of claim 5, wherein determining the second spoken language dialect further comprises:
in response to determining that the metadata does not identify the second spoken language dialect, performing a voice analysis on a spoken voice of the speaker within the audio recording to identify the second spoken language dialect of the speaker; and
saving the determined second spoken language dialect to the metadata.

9. A device comprising:
at least one input component;
at least one of an audio output component and a video output component;
a processor communicatively coupled to the input component and the at least one of an audio output component and a video output component and which executes a media playback utility, wherein the processor:
  receives, by the at least one input component, a request from a requester for a playback session of media that includes a time varying content and which is associated with a default playback rate that establishes a base speed for playback sessions of the media;
  in response to receiving the request, retrieves, from a storage that is accessible to the data processing system, a profile associated with requester and determines, from the profile, a playback rate of the media for the requester that is different from the default playback rate of the media;
  in response to determining the playback rate of the media for the requester, generates an output of the media at the determined playback rate;
  monitors, during the playback session, the at least one input device for at least one playback change made by the requester;
  receives, via the at least one input component, during the playback session of the media, at least one playback change made by the requester, the at least one playback change including at least one of: an adjustment to the playback rate of the media, pausing of the media, forwarding of the media, and rewinding of the media;
  in response to detecting at least one adjustment by the at least one input device, dynamically adapts the playback rate associated with the requester based on the received at least one adjustment by applying at least one of: an increase and a decrease to the playback rate;
  determines whether a number of occurrences of a particular type of playback change received by the at least one input device during the playback session has exceeded a predetermined threshold number of playback changes of the particular type, wherein the predetermined threshold number is greater than one;
  in response determining that the number of occurrences of the particular type of playback change has exceeded the predetermined threshold number, automatically applies an adjustment to the playback rate of the media for the requester based on the number of occurrences of the particular type of playback change, wherein the adjustment to the playback rate includes one of: an increase and a decrease to the playback rate; and
  applies the adjusted playback rate as the playback rate stored within the profile;
  wherein the at least one of the audio output component and the video output component provides the output of the media at the determined adjusted playback rate during the playback session of the media.

10. The device of claim 9, further comprising at least one of a display and a speaker, wherein the time varying content includes at least one of audio content and video content, and wherein:
the processor provides, contemporaneously with the playback session of the media, a notification of a current playback rate of the media to the requester, wherein the notification includes at least one of an audio notification and a visual notification.

11. The device of claim 9, wherein in accessing the profile associated with the requester, the processor:
first identifies the requester via at least one received identifying data;
compares the identifying data to available profiles established for media playback; and
in response to determining that there is no established profile for the requester:
generates the output of the media at the default playback rate on the at least one of an audio output component and a video output component;
prompts the requester to create the profile; and
in response to the requester creating the profile, saves the profile and establishes, within the profile, the playback rate of the media for the requester at the default playback rate.

12. The device of claim 9, wherein in determining the playback rate of the media for the identified requester, the processor:
detects a repetition count corresponding to a number of times the media has been accessed by the requester; and
in response to the repetition count being greater than a predetermined threshold count, applies an adjustment to the playback rate of the media for the requester based on the repetition count, wherein the adjustment to the playback rate includes one of: an increase and a decrease to the playback rate.

13. The device of claim 9, wherein the media includes an audio recording of speech provided a speaker, and wherein in determining the playback rate of the media for the requester, the processor:
determines, from the profile, a first spoken language dialect of the requester;
determines, from metadata associated with the media, a second spoken language dialect of the speaker;
compares the first spoken language dialect and the second spoken language dialect;
in response to the determining that the first spoken language dialect and the second spoken language dialect match, increases the playback rate of the media; and
in response to the determining the first spoken language dialect and the second spoken language dialect do not match, decreases the playback rate of the media.

14. The device of claim 13, wherein in determining the first spoken language dialect:
in response to determining that the profile does not identify the first spoken language dialect of the requester, the processor:
issues a request, via at least one output component, to the requester for a voice sample;
receives, via the input component, the voice sample from the requester;
performs an audio analysis of the voice sample to identify the first spoken language dialect; and
saves the determined first spoken language dialect to the profile.

15. The device of claim 13, wherein in determining the first spoken language dialect of the requester:
in response to determining that the profile does not identify the first spoken language dialect of the requester, the processor:
identifies a preferred language of the requester within a language preference setting of the requester; and
saves the preferred language to the profile as the first spoken language dialect.

16. The device of claim 13, wherein in determining the second spoken language dialect, the processor:
in response to determining that the metadata does not identify the second spoken language dialect, performs a voice analysis on a spoken voice of the speaker within the audio recording to identify the second spoken language dialect of the speaker; and
saves the determined second spoken language dialect to the metadata.

17. A computer program product comprising:
a computer readable storage device; and
program code on the computer readable storage device that when executed by a processor associated with a device, the program code enables the device to provide the functionality of:
receiving, by at least one input device of the device, a request from a requester for a playback session of media that includes a time varying content and which is associated with a default playback rate that establishes a base speed for playback sessions of the media;
in response to receiving the request, identifying the requester and retrieving, from a storage that is accessible to the device, a profile associated with requester and determining, from the profile, a playback rate of the media for the requester that is different from the default playback rate of the media;
in response to identifying the requester, providing, by at least one output device, the media to the requester at the determined playback rate during the playback session of the media;
during the playback session, monitoring the at least one input device for at least one playback change made by the requester;
detecting, during the playback session of the media, playback changes made by the requester via the at least one input device, the playback changes comprising at least one of an adjustment to the playback rate of the media, pausing of the media, forwarding of the media, and rewinding of the media;
in response to detecting at least one playback change by the at least one input device, dynamically adapting the playback rate associated with the requester based on the received at least one adjustment by applying at least one of: an increase and a decrease to the playback rate;
determining whether a number of occurrences of a particular type of playback change received via the at least one input device has exceeded a predetermined threshold number of playback changes of the particular type, wherein the predetermined threshold number is greater than one;
in response to determining that the number of occurrences of the particular type of playback change has exceeded the predetermined threshold, automatically applying an adjustment to the playback rate of the media for the requester based on the number of occurrences of the particular type of playback change, wherein the adjustment to the playback rate includes one of: an increase and a decrease to the playback rate; and
applying the adjusted playback rate as the playback rate stored within the profile.

18. The computer program product of claim 17, wherein the program code for accessing the profile associated with the requester comprises further comprises code that enables the device to provide the functionality of:
- first identifying the requester via at least one received identifying data;
- comparing the identifying data to available profiles established for media playback; and
- in response to determining that there is no established profile for the requester:
  - providing the media to the requester at the default playback rate;
  - prompting the requester to create the profile; and
  - in response to the requester creating the profile, saving the profile and establishing, within the profile, the playback rate of the media for the requester at the default playback rate.

* * * * *